United States Patent

Myers

[11] 3,825,020
[45] July 23, 1974

[54] METHOD OF CUTTING HAIR

[76] Inventor: Thomas Elmar Myers, 7601 Silverado Trl., Napa, Calif. 94558

[22] Filed: Jan. 19, 1972

[21] Appl. No.: 218,998

[52] U.S. Cl............................ 132/7, 30/254, 30/341
[51] Int. Cl............................................ B26b 13/12
[58] Field of Search........ 16/115; 30/232, 254, 256, 30/257, 260, 298, 340, 341; 81/415, 416, 417, 428 R; 83/34; 287/117, 60

[56] References Cited
UNITED STATES PATENTS

| | | | |
|---|---|---|---|
| 785,934 | 3/1905 | Border | 30/341 X |
| 1,480,253 | 1/1924 | Fisher | 287/60 |
| 2,250,638 | 7/1941 | Kubinec | 30/257 |
| 2,294,832 | 9/1942 | Colla | 30/260 |
| 2,370,026 | 2/1945 | Elia | 30/254 |
| 2,498,459 | 2/1950 | Schroetter | 287/62 X |
| 2,571,675 | 10/1951 | Bray | 30/254 X |
| 2,669,992 | 2/1954 | Curutchet | 81/415 X |
| 2,677,179 | 5/1954 | Scrvilla | 30/256 |
| D53,606 | 7/1919 | Rauh | 30/254 X |

*Primary Examiner*—Othell M. Simpson
*Assistant Examiner*—Mark S. Bicks
*Attorney, Agent, or Firm*—Browne, Beveridge, DeGrandi & Kline

[57] ABSTRACT

Scissors or shears for cutting hair and especially for grooming dogs or other animals are provided with a comfortable yet positive grip which allows greater facility and control in manipulation and lessens fatigue upon prolonged use. The grip is adjusted to suit the fingers of the user.

1 Claim, 6 Drawing Figures

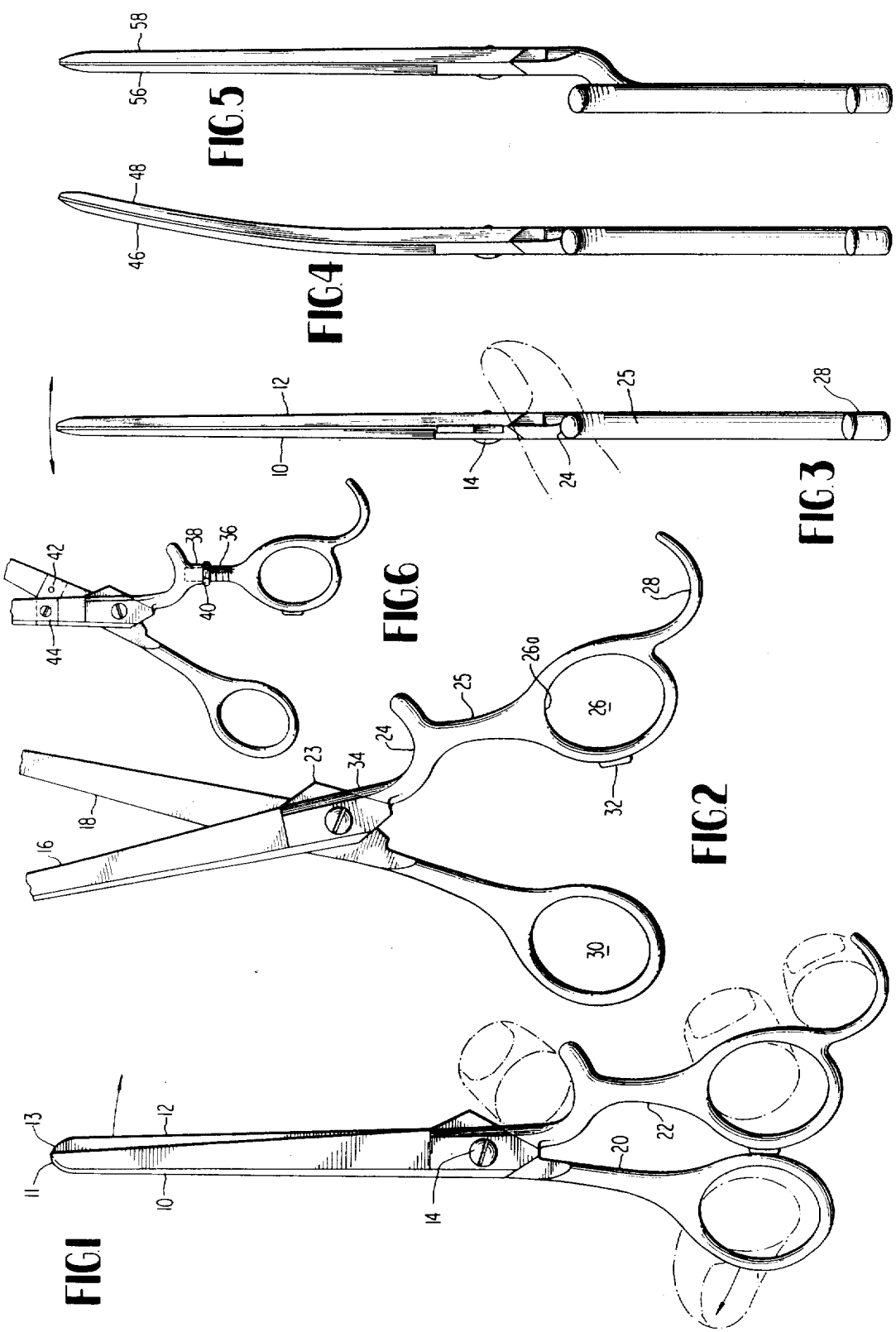

METHOD OF CUTTING HAIR

BACKGROUND OF THE INVENTION

The present invention relates to scissors and shears, and more particularly, to improvements in the handles or grips of scissors and shears. Also, the present invention relates to a novel method for cutting hair with the use of scissors.

Scissors and shears used at the present time in the cutting of hair either in beauty salons or barber shops or particularly in the grooming of dogs and other animals comprise two pivotally connected members having straight-cutting edges on one side of the pivot and handle portions with finger and thumb grips on the other side of the pivot. Conventional handles or grips are closed loops or rings, one being for the tumb of one hand and generally round, and the other being for the first and second or second and third fingers of the same hand, and being generally elliptical in outline.

In cutting hair, and in particularly in the grooming of dogs and other animals, considerable care and control must be exercised to obtain an even, gradual taper to give a pleasing appearance and especially to avoid the creation of irregularities in the finished haircut. Conventional scissors and shears, such as described above, require the use of both the fingers and opposed thumb to produce a cutting action. The fingers and opposed thumb are brought together and then apart in a spreading motion. The conventional handles or grips of scissors and shears require that they be held in a fixed lateral position relative to the plane of the hand. Lateral control is achieved only by movement of the entire hand by means of the wrist muscles. Prolonged use of conventional scissors and shears thus requires use of the muscles of the entire hand and wrist and, particularly in the case of inexperienced operators, causes great fatigue. Obviously, in the professional use of scissors and shears, as in beauty salons, barber shops and the grooming of dogs and other animals, this is a serious disadvantage. The problem is particularly acute in the grooming of dogs and other animals which may move frequently during the grooming operation requiring even greater efforts by the operator to obtain a pleasing appearance and avoid irregularities in the finished haircut.

Nothing marks the work of an amateur or inexperienced operator so much as the appearance of notches or angular ridges which present a very uneven and unattractive appearance. Although these difficulties are often encountered in cutting the hair of humans in barber shops or beauty salons, they are even more pronounced in the grooming of dogs or other animals. Even when scissors or shears are being used by an experienced operator, a careless stroke, caused by fatigue, could easily result in the same undesirable appearance.

SUMMARY OF THE INVENTION

It is an object of the present invention to provide improved scissors or shears and more specifically, improved handles for scissors or shears of the type particularly suitable for cutting hair, especially in the grooming of dogs or other animals.

Another object of the present invention is the provision of scissor handles or grips which will permit inexperienced persons to easily learn the proper handling of scissors in a cutting operation and which also facilitate manipulation and control even by inexperienced persons.

It is a further object of the present invention to provide improved handles for scissors and shears which will substantially lessen strain and fatigue of the hand and wrist muscles of the user when compared to the use of conventional scissors.

Another feature of the invention is to provide improved handles for scissors and shears which will permit easier, quicker, and more reliable manipulation of the scissors in use when compared to conventional scissors or others in the prior art. Included herein is the provision of scissor handles which will permit a high degree of control in the user, in addition to allowing accurate cutting of hair to produce a desired hair style.

Yet another feature of the invention is to provide improved handles for scissors and shears which may be adjusted to suit the hand of the user.

Other purposes, advantages and features of the present invention will appear in the following description of the preferred embodiments thereof with reference to the accompanying drawings which will now be described.

DRAWINGS

FIG. 1 is a plan view of scissors embodying the present invention.

FIG. 2 is a plan view of a portion of the scissors shown in FIG. 1 in an "open position."

FIG. 3 is a side elevation view of the scissors of FIG. 1.

FIG. 4 is a view similar to FIG. 3 but illustrating another embodiment of the invention, wherein the cutting blades are curved.

FIG. 5 is a view similar to FIG. 3 but illustrating another embodiment of the present invention wherein the cutting blades are offset from the handle.

FIG. 6 is a view similar to FIG. 2 illustrating another embodiment of the present invention containing adjustment features.

DETAILED DESCRIPTION OF THE DRAWINGS

Referring to the drawings in detail, there is shown in FIG. 1, for illustrative purposes only, an improvement for cutting hair incorporating a novel handle embodying the present invention. The shown embodiment includes two basic members 10, 12 pivoted intermediate to their ends by a conventional pivot pin 14. Basic members 10, 12 include cutting blades 16, 18 which are located above pivot pin 14. Below pivot pin 14 are shown handle sections 20, 22 in accordance with the invention. Handle 22 contains a ledge 24 below pivot pin 14 upon which the first or index finger rests in accordance with the invention to be described in greater detail. Below ledge 24 is a loop 26 from which a second ledge 28 extends below and to the right. The second finger is placed in loop 26 and the third finger is placed upon ledge 28. The thumb of the same hand is placed in loop 30. The positioning of the fingers of the right hand is shown in FIG. 1.

Attached to handle 22, between loops 26 and 30, is a bead 32. As the cutting blades 16, 18 are sharpened, they are reduced in width and thereby do not completely close at their ends 11 and 13. Therefore, after the cutting blades have been sharpened, the bead 32 is filed in such a manner as to reduce the space between the two adjacent finger loops and thus cause the pointed ends 11 and 13 of the cutting blades 16, 18 to come into registry.

In accordance with the present invention, ledge 24 is provided for the first or index finger, immediately below pivot pin 14. In a preferred embodiment of the present invention, the center of gravity of the scissors is approximately located at position 34, forming the side of ledge 24, so that in use the scissors can be balanced upon the first finger when it is placed upon ledge 24. Positioning the center of gravity of the scissors at point 34 is achieved by adjusting the weight of the cutting blades 16, 18 until the weight of the basic members 10, 12 above the point 34 equals the weight of basic members 10, 12 located beneath the point 34. The ledge 24 must be located beneath the pivot point a sufficient distance to allow cutting blade 18 space to move in when the scissor is opened as illustrated in FIG. 2, without interference by the index finger placed upon the ledge 24. The point of triangular element 23 indicates the maximum displacement of cutting blade 18 without interference by the index finger placed upon ledge 24. In use, when the scissor is held as described above, it is balanced upon the first or index finger which is placed upon ledge 24 as shown in FIG. 3. When the first finger engages ledge 24, with the other fingers positioned as described above, it may be seen that a small lateral motion of the first finger will move the cutting blades 16, 18 a considerable distance laterally. The cutting blades 16, 18 pivot about loops 26, 30 as shown in FIG. 3. Thus, substantial lateral control may be easily achieved using scissors embodying the present invention by the movement of a single finger. This may be compared with a conventional scissors or shears which require the movement of the entire wrist in order to achieve lateral control.

While ledge 24 must be located sufficiently beneath pivot pin 14 to permit free movement of blade 18 as discussed above, it must be placed as much above the loop 26 as possible to ensure maximum lateral control. Lateral control as used herein may be defined as the ability to move the plane of the cutting blades of the scissors laterally, towards or away from the surface of the subject whose hair is to be cut, coupled with the ability to keep the plane of the cutting blades a selected distance from the subject whose hair is being cut. It has been found that for sufficient lateral control, the ledge 24 must be placed above the midpoint of an imaginary vertical line projecting downward of pivot pin 14 to bead 32. This is in contrast to prior art scissors such as shown in U.S. Pat. Nos. 2,370,026 and 2,677,179. As the position of ledge 24 approaches loop 26, the degree of control which may be exercised by movement of the first finger placed upon ledge 24 lessens until when ledge 24 is placed adjacent to loop 26, virtually no lateral control may be obtained by movement of the first finger. This has been a serious failing of certain prior art scissors such as exemplified in U.S. Pat. No. 2,343,527 to Boyle.

Another important feature of the invention is that when the scissors or shears are held as described above, with the first finger applying pressure against ledge 24, the second finger applying pressure against the upper portion 26a of loop 26, and the third finger applying pressure against ledge 28, handle 22 and associated cutting blade 16 will be substantially anchored or motionless except for any desired lateral movements caused by pressure exerted by the first finger upon ledge 24. The aforedescribed anchoring permits the cutting action to be accomplished simply by the vertical motion of the thumb in loop 30 actuating handle 20 and associated cutting blade 18 as shown in FIG. 1. This is an advantage over conventional shears or scissors, which require both the thumb and opposed fingers to be used together, to simultaneously move both handle sections in order to obtain cutting action.

It should further be noted that the ledge 24 projects generally at right angles relative to cutting blade 16 and stem 25. Moreover, the length of ledge 24 is sufficient to project it beyond stem 25 with the ledge 24 aligned above loop 26 to allow the user to squeeze ledge 24 and upper portion 26a of loop 26 to firmly anchor or hold the scissors in a cutting operation while permitting the operator to move the scissors laterally inwardly and outwardly from the subject whose hair is being cut. The abovementioned dimensioning and positioning of ledge 24 is in superior contrast to the recesses heretofore employed in prior art claims such as exemplified in the aforementioned patents.

In the conventional scissors or shears, the wrist muscles must be used to obtain lateral control and the muscles of both the thumb and the fingers must be used to obtain cutting action. In sharp contrast thereto, in the instant scissors or shears, only a single finger (the index finger exerting pressure upon ledge 24) need be used to obtain lateral control and only the thumb (exerting pressure within loop 30) need be moved to obtain cutting action. Therefore, not only are the instant scissors or shears substantially easier to use than conventional scissors, but they may be used with less effort and consequently less fatigue over an extended period of time. Thus, the instant scissors or shears are particularly suitable for use in the cutting of hair in beauty salons or in barber shops or especially in the grooming of dogs or other animals where more movement of the object is usually encountered.

It is another feature of the present invention that the distance between the ledge 24 and loop 26 may be varied as illustrated in FIG. 6. Here handle 22 is modified by replacing solid stem 25 by a threaded arrangement 36, 38. The right-hand loop 26 is attached to a threaded screw 36 and arranged for threaded engagement in a tapped hole 38 formed beneath ledge 24. Lock nut 40 permits threaded screw 36 to be securely held at any desired extension. By means of this screw arrangement, the distance between ledge 24 and loop 26 of handle 22 may be adjusted to accommodate the preference of individual users. It is of course also possible to provide a threaded screw portion extending downward from ledge 24 as well as upward from loop 26, such threaded screw portions being arranged for threaded engagement in a collar connecting them. This alternative provides for the possibility of additional separation between ledge 24 and loop 26 should this be desired.

Another feature of the present invention is that cutting blades 16 and 18 may be arranged so as to be detachable for easy replacement as illustrated in FIG. 6. Cutting blades 16 and 18 may be removably attached to basic element 10 and 12 by a "dovetailed" arrangement held by screws 42 and 44 arranged for threaded engagement in tapped holes formed in basic elements 10 and 12.

FIGS. 4 and 5 illustrate other preferred embodiments of the present invention. FIG. 4 shows the same handles as described above and shown in FIGS. 1 and 2 or 6, but having blades 46, 48 which are curved in a gentle arc as shown. FIG. 5 represents another embodiment of the present invention having the same handle portions as described and illustrated in FIGS. 1 and 2 or 6, but having blades 56, 58 which are offset from said handles as shown. Such a scissor is particularly useful when it is desired to keep the blades of said scissors both parallel and close to the surface containing the hair to be cut. The offset handles provides sufficient space for the figures of the hand operating the scissors or shears. It will of course be obvious to one of ordinary skill in the art to combine an offset handle as illustrated in FIG. 5 with a curved blade as illustrated in FIG. 4.

It is understood that various other modifications will be apparent to and can readily be made to those skilled in the art without departing from the scope and spirit of this invention. For example, scissors or shears designed to be held in the left hand are an obvious modification. Accordingly, it is not intended that the scope of the claims appended hereto be limited to the description set forth herein, but rather that the claims be construed as encompassing all the features of patentable novelty which reside in the present invention including all features which would be treated as an equivalent thereof by those skilled in the art to which the invention pertains.

I claim:

1. A method of cutting hair using scissors having a pair of cooperating cutting members mounted by pivot means intermediate their ends and including a handle section associated with each of said cutting members; one of said handle sections comprising a loop adapted to receive the thumb of a hand; the other said handle section comprising a ledge adapted to receive the first finger of said hand, a loop adapted to receive the second finger of said hand, and a finger rest adapted to receive the third finger of said hand, said ledge being above a mid point of a vertical line projecting downward of said pivot means to the center of said loop adapted to receive said second finger; the steps comprising:

placing said thumb in said loop adapted to receive said thumb;

placing said first finger upon said ledge adapted to receive said first finger;

placing said second finger within said loop adapted to receive said second finger, and placing said third finger upon said finger rest adapted to receive said third finger;

applying a compressive force between said ledge and said loop anchoring said associated cutting member in a fixed position;

moving said thumb towards and away from said anchored cutting member to pivot the other cutting member for cutting hair while the other cutting member remains substantially stationary; and moving said cutting members laterally toward and away from a subject whose hair is being cut by applying a force through said first finger and the ledge.

* * * * *